UNITED STATES PATENT OFFICE.

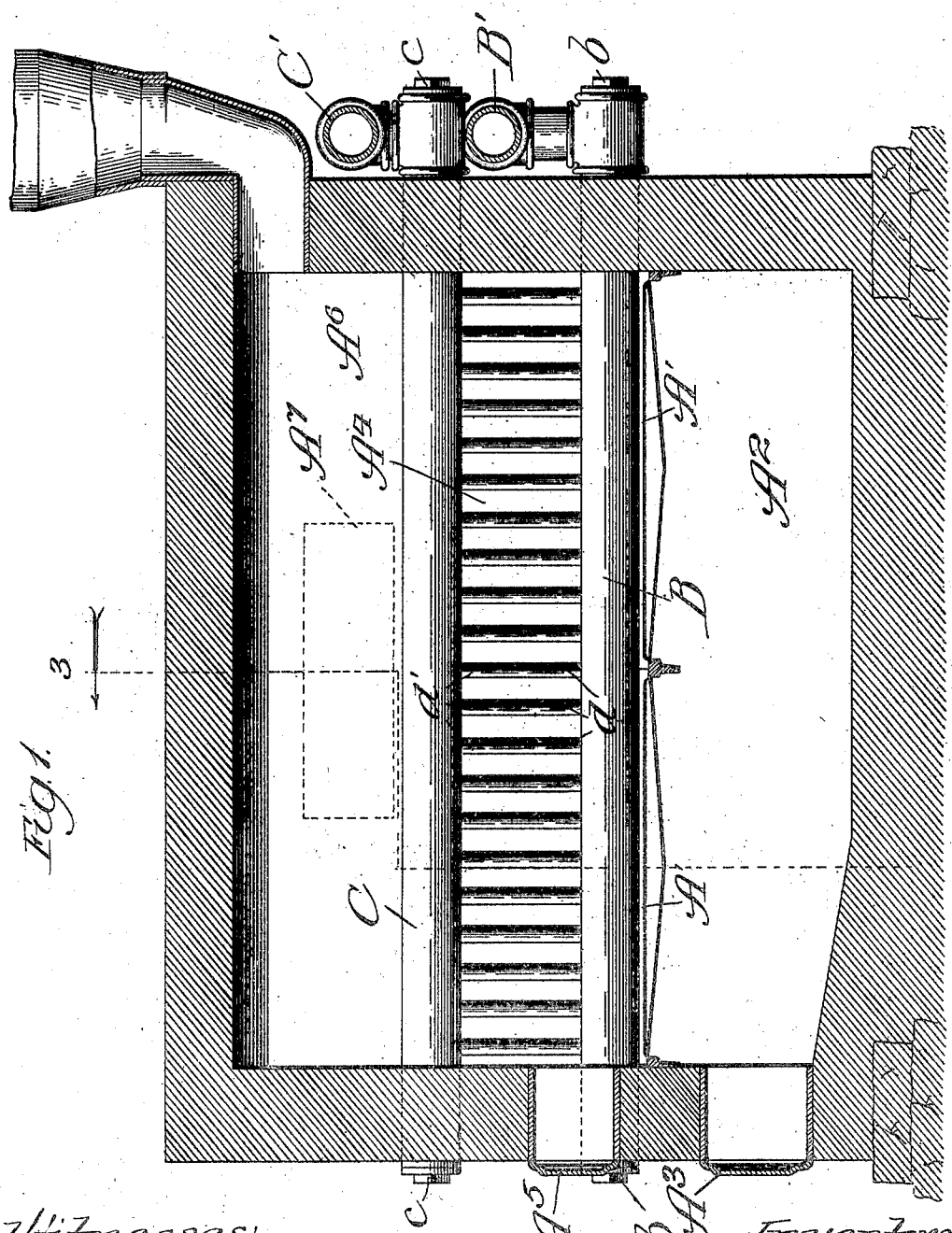

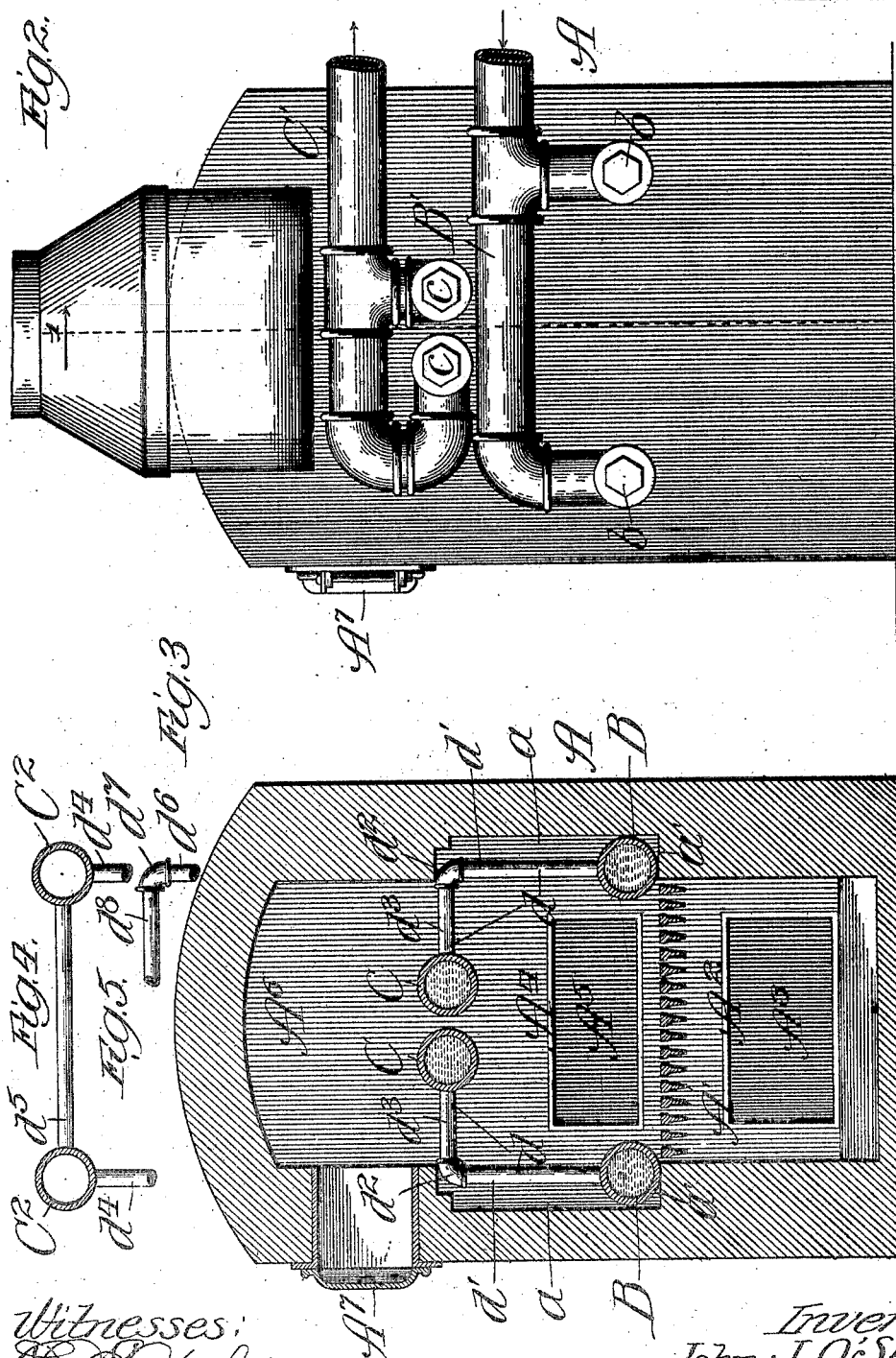

JOHN J. O'SHEA AND JEREMIAH O'SHEA, OF CHICAGO, ILLINOIS.

FURNACE.

No. 811,867.　　　　Specification of Letters Patent.　　　　Patented Feb. 6, 1906.

Application filed December 18, 1903. Renewed December 26, 1905. Serial No. 293,326.

*To all whom it may concern:*

Be it known that we, JOHN J. O'SHEA and JEREMIAH O'SHEA, citizens of the United States, residing at Chicago, in the county of Cook and State of Illinois, have invented a new and useful Improvement in Furnaces, of which the following is a specification.

Our invention relates more particularly to garbage-crematories for domestic use, or, in other words, to furnaces intended especially for use in consuming garbage and heating water for bath, lavatory, and other domestic purposes.

Our primary object is to provide an improved furnace particularly adapted for use in apartment-buildings where there is a large amount of garbage and refuse to be disposed of and an abundant supply of hot water for domestic purposes is required.

The invention is illustrated in the accompanying drawings, in which—

Figure 1 represents a vertical longitudinal section of our improved furnace; Fig. 2, an end elevational view of the same; Fig. 3, a transverse section taken, as indicated, at line 3 of Fig. 1; and Figs. 4 and 5 details illustrating modifications of the water-tube construction employed.

Referring to Figs. 1 to 3, inclusive, A represents a furnace having the usual grate A', ash-pit $A^2$, ash-pit door $A^3$, coal-combustion chamber $A^4$, charging-door $A^5$ therefor, garbage-combustion chamber $A^6$, and charging-door $A^7$ therefor. As indicated, the grate preferably extends the full length of the furnace. The side walls of the furnace are preferably recessed interiorly at $a$ to receive the water-tube construction without undue obstruction to the combustion-chamber $A^4$. In this manner there are provided longitudinal ledges $a'$, extending the length of the interior of the furnace, upon which ledges are supported the members of a pair of longitudinal pipes B B, whose ends project through the end walls of the furnace and are provided with removable plugs $b$. The pipes B communicate at one end with a transverse pipe B', which constitutes a supply or return pipe of the water-tube system of the furnace. Extending longitudinally of the central portion of the furnace between the combustion-chambers $A^4$ and $A^6$ are two parallel pipes C C, whose ends project through the end walls of the furnace and are equipped with removable plugs $c$. The pipes C are in communication at one end with a transverse pipe C', located outside the furnace and constituting the outgoing or hot-water pipe of the system. Each one of the pair of pipes B B is connected by a series of small water-tubes $d$ with the corresponding one of the pair of pipes C. Each tube $d$ comprises a vertical member $d'$, an elbow $d^2$, and a horizontal member $d^3$. The members $d'$ $d^3$ are preferably oppositely threaded at their extremities to permit ready connection and disconnection.

It will be observed that the pipes C C and the horizontal members $d^3$ virtually form a grate beneath the combustion-chamber $A^6$, and inasmuch as the pipes C are of relatively large diameter and are supported at the end walls of the furnace a substantial construction is provided which serves to prevent sagging of the upper tubular grate under the weight of the garbage when the tubes are heated. The pipes C C should of course be of sufficient cross-section to prevent undue retardation of the water in the tubes $d$. The construction and arrangement is such that the water-tube system is amply supported, while at the same time the heat produced by the combustion of the fuel and garbage is fully utilized. It will be undertood that the pipes B' C' commonly connect with a tank of desired storage capacity, so that a supply of hot water is always on hand when the furnace is in operation. The storage-tank (not shown) may be supported at the side of the furnace in the usual manner. The charging-door $A^7$ is preferably located at the side of the furnace and is of ample size to permit the garbage to be thrown in and distributed over the tubular grate-surface.

In the modification shown in Fig. 4 the pipes $C^2$ correspond with the pipes C of the described construction and the tubes $d^4$ with the tubes $d'$ thereof. In this construction the pipes $C^2$ are in the same vertical planes as the pipes B and are connected by transverse tubes $d^5$.

In the modification of Fig. 5 one of the pipes $C^2$ is dispensed with and the vertical tubes $d^3$, corresponding with the vertical tubes $d^4$, are connected by elbows $d^7$ with the transverse tubes $d^8$, corresponding with the transverse tubes $d^5$. In this modification the remaining pipe $C^2$, it will be understood, should be of a large enough cross-section to carry all the water rising through the series of small tubes at the two sides of the furnace.

As is well understood, in a furnace of this character much sediment is deposited in the pipes in the operation of the furnace, and the object of providing the removable plugs at the ends of the furnace is to provide for the ready removal of the sediment from the system. In case a water-tube is burned out or injured a new one may be readily substituted in its place by removing a brick from the wall at the elbow $d^2$, which will permit the tube-sections to be readily disconnected. The construction is such that the draft from the lower combustion-chamber is compelled to pass through the garbage, thereby insuring rapid combustion in the upper combustion-chamber.

While the construction illustrated in Figs. 1 to 3, inclusive, is preferred, it will be understood that changes in details of construction within the spirit of our invention may be made. Hence no undue limitation should be understood from the foregoing detailed description.

What we regard as new, and desire to secure by Letters Patent, is—

1. In a furnace of the character described, the combination of a combustion-chamber provided with a suitable grate, substantially horizontal pipes arranged along opposite sides of the lower portion of said combustion-chamber, series of tubes rising from said pipes within said combustion-chamber, a substantially horizontal tubular grate in communication with said series of tubes, and a superposed combustion-chamber, of which said second-named grate forms the bottom, said last-named chamber having a charging-door and a smoke-stack connection, for the purpose set forth.

2. In a furnace of the character described, the combination of a combustion-chamber provided with a suitable grate and adjacent to said grate with ledges, substantially horizontal water-pipes located above said ledges, a superposed combustion-chamber, a pair of parallel pipes located between the lower and upper combustion-chambers, and water-tubes joining the pipes and comprising horizontal and vertical members, the horizontal members forming with the second-named pair of pipes a tubular grate for the upper combustion-chamber, for the purpose set forth.

3. In a furnace of the character described, the combination of a combustion-chamber provided with a suitable grate, a pair of longitudinal pipes located at the sides of said combustion-chamber near the base thereof and having ends projecting through the end walls of the furnace, a common supply-pipe for the said pipes, substantially vertical tubes rising from said first-named pipes, and a tubular grate at the upper portion of said combustion-chamber comprising in its structure substantially horizontal tube-sections and a longitudinal pipe or pipes in communication therewith and having ends projecting through the end walls of said furnace, for the purpose set forth.

4. In a furnace of the character described, the combination of a combustion-chamber provided with a suitable grate, a pair of pipes arranged at opposite sides of the lower portion of said combustion-chamber and having ends projecting through an end wall of said furnace, a transverse supply-pipe communicating with the projecting ends of said first-named pipes, a pair of centrally-located pipes at the upper portion of said combustion-chamber having ends projecting through an end wall of the furnace, a transversely-extending outgoing pipe communicating with the projecting ends of said last-named pair of pipes, and a series of tubes connecting each member of said first-named pair of pipes with the corresponding member of said second-named pair of pipes and comprising horizontal sections forming with said pair of centrally-located pipes a tubular grate.

5. In a furnace of the character described, the combination of a combustion-chamber provided with a suitable grate and having recessed walls, a pair of pipes located in the lower portion of the recesses of said walls, a pair of centrally-located pipes having their ends supported in the end walls of said furnace above said first-named pipes, and a series of tubes connecting each member of said first-named pair of pipes with the corresponding member of said second-named pair of pipes, each tube having a substantially vertical portion lying in a recess of the corresponding wall and a substantially horizontal portion communicating with the corresponding member of said second-named pair of pipes, for the purpose set forth.

6. In a furnace of the character described, the combination of a combustion-chamber provided with a suitable grate, a pair of horizontal pipes located at opposite sides of the lower portion of said combustion-chamber and having ends projecting through the end walls of said furnace and equipped with removable plugs, a series of tubes rising from each one of said pipes within the combustion-chamber, a superposed combustion-chamber, and a tubular grate, comprising in its structure a pipe or pipes having ends projecting through the end walls of said furnace and equipped with removable plugs, and substantially horizontally disposed tubes in communication with said last-named pipe or pipes and said first-named tubes, for the purpose set forth.

JOHN J. O'SHEA.
JEREMIAH O'SHEA.

In presence of—
L. HEISLAR,
WALTER N. WINBERG.